Patented Dec. 10, 1929

1,739,094

UNITED STATES PATENT OFFICE

KARL SCHMIDT, OF NEURUPPIN, GERMANY, ASSIGNOR, BY MESNE ASSIGNMENTS, TO PYRENE-MINIMAX CORPORATION, A CORPORATION OF DELAWARE

PROCESS OF PRODUCING A DRY MIXTURE OF CHEMICALS SUITABLE FOR THE PREPARATION OF FIRE FOAM

No Drawing. Application filed April 18, 1927, Serial No. 184,832, and in Germany September 1, 1926.

My invention relates to a process of producing a dry mixture of chemicals suitable for the preparation of fire foam.

In powdery mixtures of chemicals serving for the generation of foam for fire extinguishing purposes it is of the greatest importance that they should be perfectly dry so that they do not agglomerate during the storage or the constituents react upon one another, and in order that they may flow easily into the apparatus serving for the preparation of the foam.

Attempts to keep mixtures of chemicals of this kind dry by adding hygroscopic substances to them, such as for example sodium carbonate, infusorial earth or the like have not given entire satisfaction.

My improved process consists in drying the consituents of a mixture of chemicals suitable for the generation of foam, for instance sodium bicarbonate, saponin, aluminium sulphate, and if desired also sodium carbonate, prior to mixing them together individually at a temperature of about 60° C. and then mixing them together with a filling material, such as pumice stone, fine sand or finely ground clay. It has been ascertained that when drying the chemicals at a temperature of approximately 60° C. the change of the chemicals (for instance the reconversion of sodium bicarbonate into sodium carbonate) is so small that it is practically immaterial for the production of the foam. As a rule it is sufficient to dry the chemicals about 48 hours.

As a filling material for providing a cushioning layer between the particles of the mixture of chemicals which primarily has to take up small quantities of humidity of the air, ground pumice stone, fine sand and finely ground clay are very suitable. Particularly suitable is finely ground pumice stone as it has a very low specific weight, so that it is easily washed away and carried along by the foam and thus no risk exists that it settles down in the valves of the apparatus used for the production of the foam and prevents their closing. The best effect of this cushioning admixture occurs when it is applied in a proportion of about 5% of the total quantity of the mixture of the chemicals.

Various changes may be made in the process without departing from the spirit of my invention and the scope of the appended claims.

I claim as my invention:—

1. The process of producing a dry mixture of chemicals suitable for the preparation of fire foam, which consists in drying aluminium sulphate, sodium bicarbonate, saponin and sodium carbonate individually at about 60° C., mixing them together and adding simultaneously ground pumice to them.

2. The process of producing a dry mixture of chemicals suitable for the preparation of fire foam, which consists in drying aluminum sulphate, sodium bicarbonate and saponin individually at about 60° C., mixing them together and adding ground pumice to them.

In testimony whereof I affix my signature.

KARL SCHMIDT.